United States Patent
Mori (10) Patent No.: US 9,641,703 B2
(45) Date of Patent: May 2, 2017

(54) IMAGE FORMING APPARATUS WITH SETTABLE PRINTING SPEED AND IMAGE FORMATION SYSTEM

(71) Applicant: KYOCERA Document Solutions Inc., Osaka (JP)

(72) Inventor: Masato Mori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/216,456

(22) Filed: Jul. 21, 2016

(65) Prior Publication Data

US 2017/0026527 A1 Jan. 26, 2017

(30) Foreign Application Priority Data

Jul. 24, 2015 (JP) .................. 2015-146346

(51) Int. Cl.
*G06F 3/12* (2006.01)
*H04N 1/00* (2006.01)
*G06K 15/00* (2006.01)

(52) U.S. Cl.
CPC ....... *H04N 1/00236* (2013.01); *G06F 3/1268* (2013.01); *H04N 1/00411* (2013.01); *H04N 2201/0081* (2013.01); *H04N 2201/0094* (2013.01)

(58) Field of Classification Search
CPC ....... H04N 1/00236; H04N 2201/0081; H04N 2201/0094; G06F 3/126; G06F 3/1204; G06F 3/1268; G06F 3/1292
USPC .................................. 358/1.1–1.18
See application file for complete search history.

(56) References Cited

U.S. PATENT DOCUMENTS

| | | | |
|---|---|---|---|
| 2003/0011805 A1* | 1/2003 | Yacoub ................. | G06F 3/1204 358/1.15 |
| 2008/0259399 A1* | 10/2008 | Wada .................... | G06F 3/1204 358/1.15 |
| 2012/0136634 A1* | 5/2012 | Yamade ................. | G06Q 10/06 703/1 |
| 2012/0212766 A1* | 8/2012 | Imamoto ................ | G06F 3/122 358/1.14 |
| 2015/0153970 A1* | 6/2015 | Tomida ................... | G06F 3/126 358/1.15 |

FOREIGN PATENT DOCUMENTS

JP 2014-200915 A 10/2014

* cited by examiner

*Primary Examiner* — Gabriel Garcia
(74) *Attorney, Agent, or Firm* — Stein IP, LLC (57) ABSTRACT

An image forming apparatus has a communication unit that receives a print job from an execution request source computer, a printing unit that executes the print job, a controller, and a storage. The storage stores route information. The controller identifies the execution request source computer, determines a movement route along which a user moves from the execution request source computer to the image forming apparatus, and sets printing speed of the printing unit lower the longer the determined movement route.

4 Claims, 6 Drawing Sheets

| RANGE OF LENGTH | RANGE A | RANGE B | RANGE C |
|---|---|---|---|
| PRINTING SPEED | HIGH SPEED (FULL SPEED) | MEDIUM SPEED (3/4 SPEED) | LOW SPEED (1/2 SPEED) |
| NOISE | LOUD | MEDIUM | SLIGHT |

IMAGE FORMING APPARATUS WITH SETTABLE PRINTING SPEED AND IMAGE FORMATION SYSTEM

INCORPORATION BY REFERENCE

This application is based upon and claims the benefit of priority from the corresponding Japanese Patent Application No. 2015-146346 filed on Jul. 24, 2015, the entire contents of which are incorporated herein by reference.

BACKGROUND

The present disclosure relates to an image forming apparatus that can execute a print job, and to an image formation system.

An image forming apparatus provided with a printing function (an image forming apparatus that can execute a print job) is communicably connected to a personal computer (hereinafter referred to as the PC) that can be the source of a request to execute a print job. The image forming apparatus receives requests to execute print jobs from the PC, and executes the print jobs in the order in which it has accepted them.

For image forming apparatuses provided with a printing function, there have been proposed various techniques for improved convenience to a user who has come to fetch the printed document resulting from a print job. For example, an image forming apparatus is known that estimates the time at which a user who is the source of a request to execute a print job will reach the image forming apparatus so that the print job is completed before the execution request source user reaches the image forming apparatus. With this image forming apparatus, the execution request source user who has come to fetch the printed document (the user who has reached the image forming apparatus) is less likely to encounter the inconvenience of having to wait for a long time.

SUMMARY

According to a first aspect of the present disclosure, an image forming apparatus includes a communication unit, a printing unit, a controller, and a storage. The communication unit is communicably connected to a plurality of computers of which any can be a source of an execution request for a print job, and receives the print job from one of the computer that is the source of the execution request. The printing unit executes the print job at a set printing speed when the communication unit receives the print job. The controller sets the printing speed for the print job. The storage stores information. The storage stores route information based on which to determine a movement route along which a user moves from each of the plurality of computers to the image forming apparatus. When the communication unit receives the print job, the controller identifies the computer that is the source of the execution request, determines, based on the route information, the movement route along which the user moves from the computer that is the source of the execution request to the image forming apparatus, and sets the printing speed lower the longer the determined movement route.

According to a second aspect of the present disclosure, an image formation system includes the image forming apparatus described above, and the plurality of computers that are communicably connected to the image forming apparatus. Each of the plurality of computers accepts entry by the user of location information on a location of the image forming apparatus, a location of each of the plurality of computers, and a location of an obstacle that can interfere with the user when the user moves from each of the plurality of computers to the image forming apparatus, and transmits the location information to the image forming apparatus. On receiving the location information from any of the plurality of computers, the image forming apparatus updates the route information based on the location information.

DETAILED DESCRIPTION

An image forming apparatus according to one embodiment of the present disclosure will be described below. The following description takes up, as an example, a multifunction peripheral provided with a plurality of functions such as a printing function and a copying function.

Figure 1:
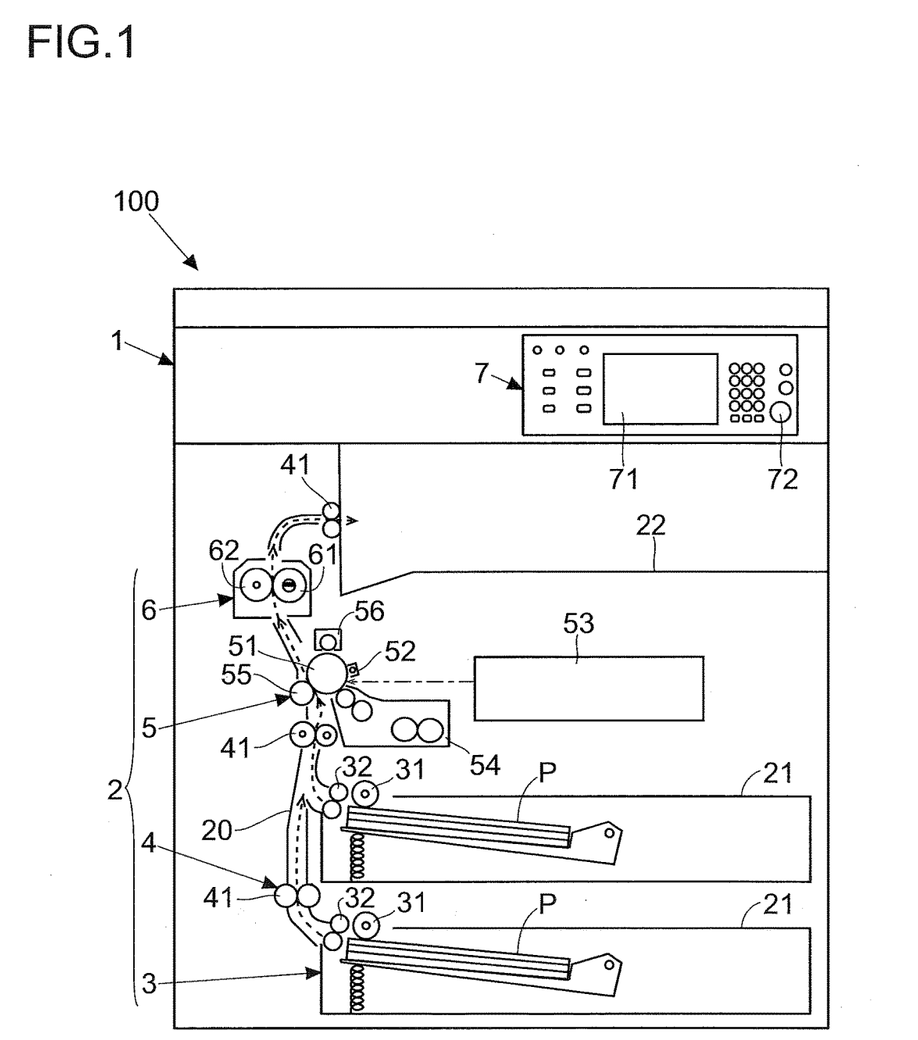
FIG. 1 is a diagram showing a configuration of a multifunction peripheral according to one embodiment of the present disclosure.

Overall Configuration of an Image Forming Apparatus: As shown in FIG. 1, the multifunction peripheral 100 (hereinafter referred to as the MFP 100) according to the embodiment includes an image reading section 1 and a printing section 2. The image reading section 1 reads a document to generate image data. The printing section 2 transports a sheet P along a sheet transport passage 20, forms a toner image based on the image data, and prints the toner image on the sheet P while this is being transported (executes a print job).

The printing section 2 is composed of a sheet feed unit 3, a sheet transport unit 4, an image forming unit 5, and a fixing unit 6. The sheet feed unit 3 includes a pick-up roller 31 and a sheet feed roller pair 32, and feeds sheets P stored in a sheet cassette 21 into the sheet transport passage 20. The sheet transport unit 4 includes a plurality of transport roller pairs 41, and transports sheets P along the sheet transport passage 20.

The image forming unit 5 includes a photosensitive drum 51, a charging device 52, an exposing device 53, a developing device 54, a transfer roller 55, and a cleaning device 56. The image forming unit 5 forms a toner image based on image data, and transfers (prints) the toner image to a sheet P. The fixing unit 6 includes a heating roller 61 and a pressing roller 62, and applies heat and pressure to the toner image transferred to the sheet P to fix the image to the sheet P.

The printed document (the printed sheet P) that has passed through the fixing unit 6 is transported along the sheet transport passage 20 by the sheet transport unit 4. Eventually, the printed document is discharged onto a sheet discharge tray 22.

The MFP 100 is provided with an operation panel 7. The operation panel 7 includes a touch-screen display 71. The touch-screen display 71 displays software keys, messages, etc., and accepts operations (touch operations on the software keys) for making various settings on the MFP 100. The operation panel 7 is also provided with hardware keys 72 such as a Start key and a numerical key pad.

Figure 2:
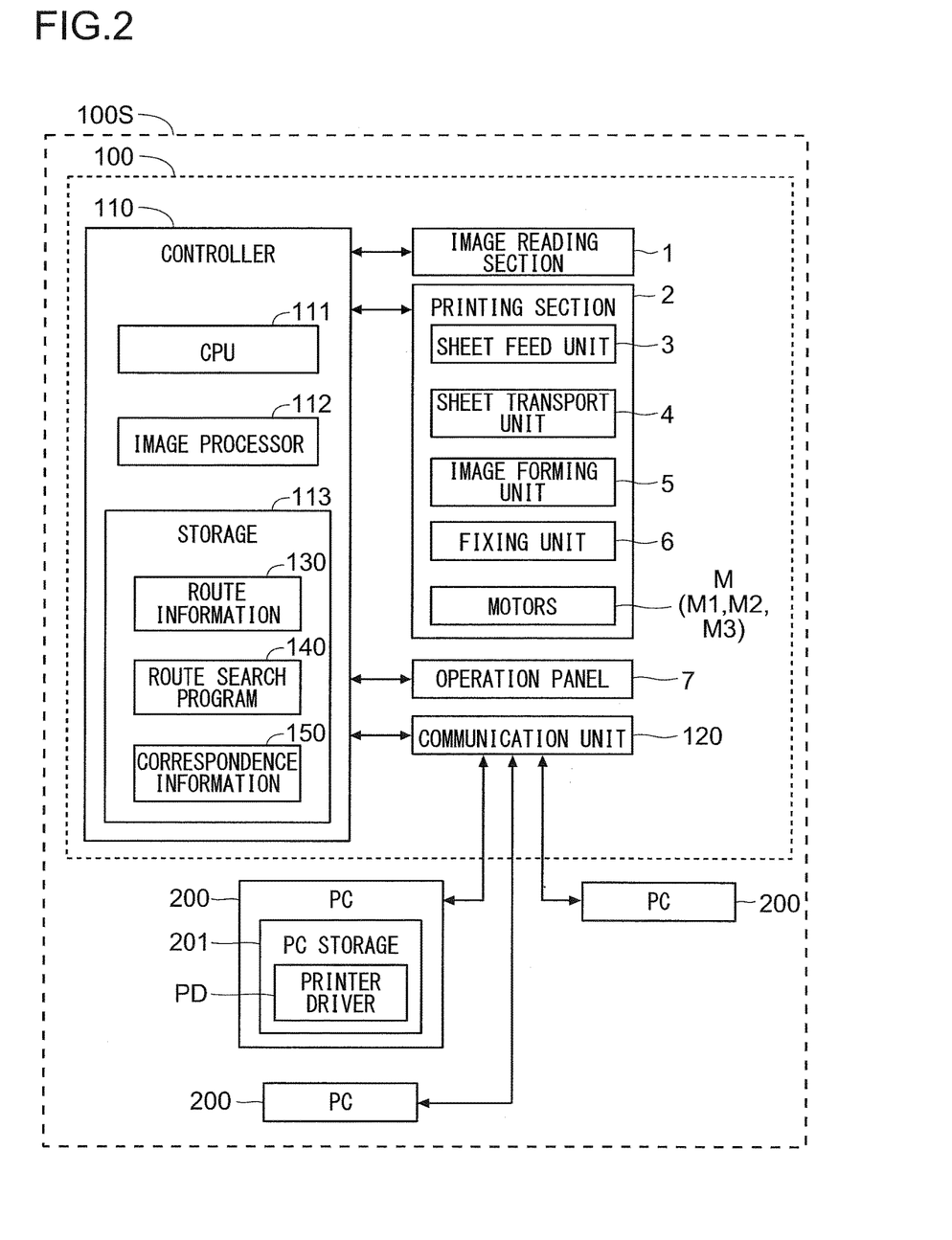
FIG. 2 is a diagram showing a hardware configuration of the multifunction peripheral according to one embodiment of the present disclosure.

Hardware Configuration of the Image Forming Apparatus: As shown in FIG. 2, the MFP 100 is provided with a controller 110 and a communication unit 120. The controller 110 controls the entire MFP 100. The communication unit 120 receives instructions from the controller 110 to communicate with an external device (such as a PC 200, as will be described later).

The controller 110 includes a CPU 111, an image processor 112, and a storage 113. The image processor 112 comprises an ASIC or the like that is dedicated to image processing, and subjects image data to various kinds of image processing (such as enlargement/reduction, density conversion, and data format conversion). The storage 113 comprises ROM, RAM, and a HDD or the like. The storage 113 stores programs and data for control. Based on the programs and data for control stored in the storage 113, the controller 110 controls the relevant parts of the MFP 100.

Specifically, the controller 110 is connected to the image reading section 1, and controls the reading operation by the image reading section 1. The controller 110 is connected also to the printing section 2 (the sheet feed unit 3, the sheet transport unit 4, the image forming unit 5, and the fixing unit 6), and controls the printing operation by the printing section 2.

The printing section 2 includes motors M (motors M1, M2, and M3) for rotating various rotary members. The motor M1 rotates, among others, the pick-up roller 31 and the sheet feed roller pair 32 in the sheet feed unit 3 and the transport roller pairs 41 in the sheet transport unit 4. The motor M2 rotates, among others, the photosensitive drum 51 in the image forming unit 5. The motor M3 rotates, among others, the heating roller 61 in the fixing unit 6. These motors M in the printing section 2 are connected to the controller 110. The controller 110 controls the driving of the motors M so as to rotate the various rotary members in the printing section 2 properly.

The controller 110 is connected to the operation panel 7. The controller 110 controls the displaying operation by the operation panel 7, and detects operations that are made on the operation panel 7.

The communication unit 120 is communicably connected to a personal computer 200 (hereinafter referred to as the PC 200) across a network such as a LAN (local area network). The PC 200 is used by a user of the MFP 100, and is a notebook-type or desktop-type personal computer. The PC 200 includes a PC storage 201, where a printer driver PD is stored which is a software program necessary to use the printing function of the MFP 100.

When the MFP 100 is used as a printer, the user creates image data of, for example, a document on the PC 200, and requests, via the PC 200, the MFP 100 to execute a print job. For example, the PC 200 displays a print setting screen (unillustrated) to accept print preferences (such as the number of copies and sheet size). By operating a predetermined icon (an icon for accepting an execution request for a print job) on the print setting screen, the user can request the MFP 100 to execute the print job.

On accepting the operation on the predetermined icon, the PC 200 generates job data for the print job, and transmits it to the MFP 100. For example, the job data for a print job includes the image data of the image to be printed, print preferences, and identification information that identifies the execution request source PC 200, that is, the PC 200 that has requested execution of the print job (or the user ID of the execution request source user).

The print job from the PC 200 is received by the communication unit 120. When the communication unit 120 receives the print job, the controller 110 recognizes receipt of the execution request for the print job. The controller 110 then checks the job data of the print job, and makes the printing section 2 execute the print job based on the job data. Specifically, the printing section 2 forms a toner image based on the image data included in the job data of the print job received by the communication unit 120, and prints the toner image on a sheet.

In the embodiment, the MFP 100 and the PC 200, which are communicably connected together, constitute an image formation system 100S. The image formation system 100S can include a plurality of PCs 200. The printer driver is then installed on all the PCs 200. That is, any of the plurality of PCs 200 included in the image formation system 100S can be the source of a request to execute a print job.

Setting the Printing Speed: When the communication unit 120 receives a print job (when it receives an execution request for a print job), the controller 110 identifies the execution request source PC 200 based on the identification information included in the job data of the print job. The controller 110 also determines the movement route along which the user will move from the execution request source PC 200 to the MFP 100. The movement route determined by the controller 110 serves as a reference that is referred to when the printing speed of the printing section 2 is set, and will occasionally be referred to as the setting reference route in the following description.

In the storage 113, there is stored route information 130 on the basis of which the movement route along which the user will move from the PC 200 to the MFP 100 is determined. For example, the route information 130 includes information on the locations (coordinates) of the MFP 100, any PC 200, and any obstacle that may be present within the area in which the MFP 100 is located. The information on the location of a PC 200 is stored in association with the identification information of that PC 200. An obstacle can be any object that may interfere with the user when the user moves from a PC 200 to the MFP 100, examples including desks, cabinets, and partitions.

In the storage 113, there is previously stored a route search program 140 that is run to determine the setting reference route based on the route information 130. The route search program 140 makes the controller 110 execute a route search routine to search for a movement route from the location of the MFP 100 as the point of departure to the location of the MFP 100 as the point of destination. The route search program 140 is automatically started when the MFP 100 is started up or when it recovers from a sleep mode. The route search program 140 may be started when the communication unit 120 receives a print job. When the communication unit 120 receives a print job, the route search program 140 makes the controller 110 execute the route search routine.

In the route search routine based on the route search program 140, the locations of the MFP 100 and any PC 200 as well as the location of any obstacle are taken as parameters so that a movement route is searched for with consideration given to the location of the obstacle. That is, the controller 110, by executing the route search routine based on the route search program 140, determines a movement route that leads from an execution request source PC 200 to the MFP 100 without interfering with an obstacle, along with the length of that movement route.

Figure 3:
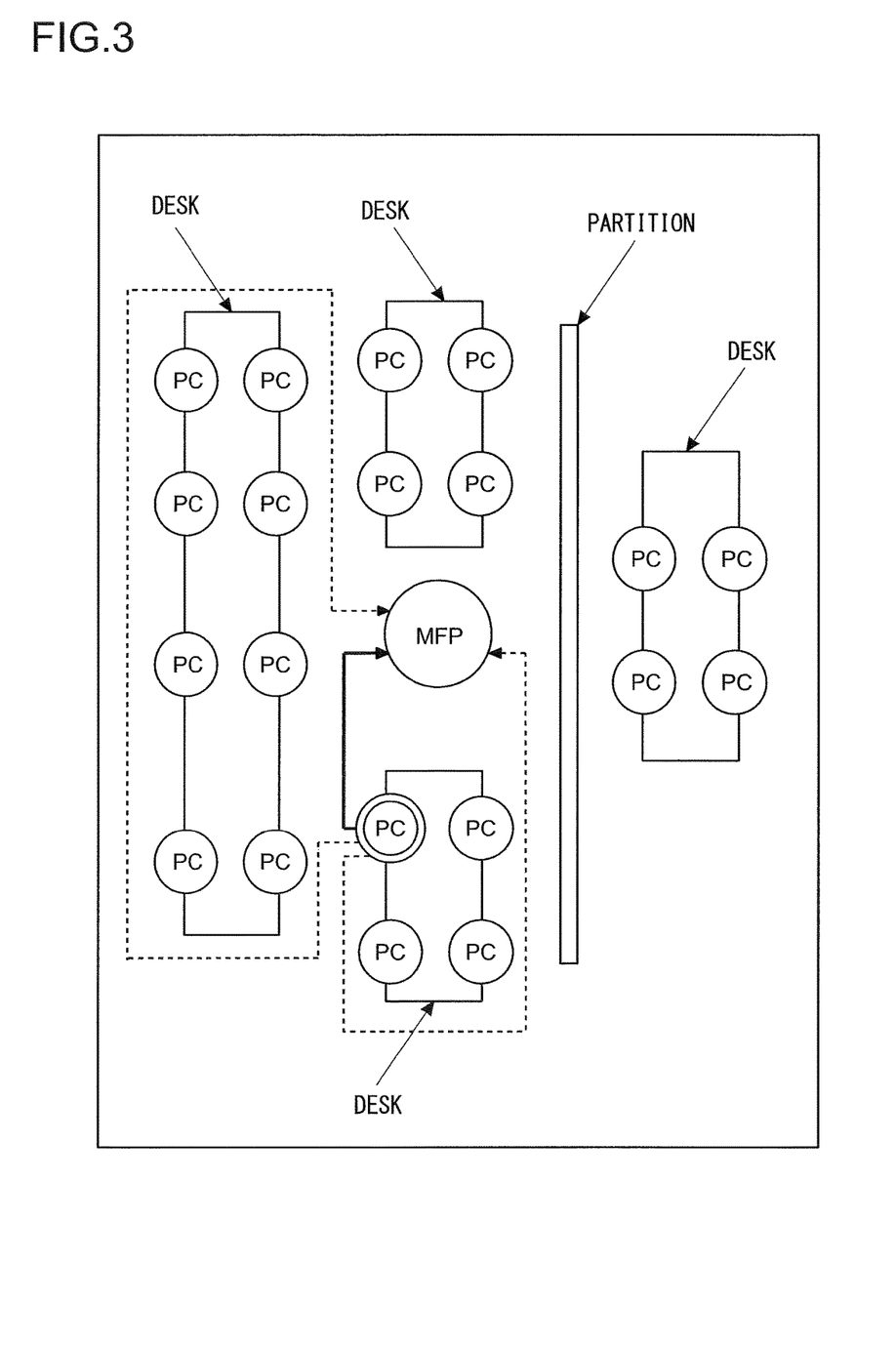
FIG. 3 is a diagram illustrating a route search routine executed in the multifunction peripheral according to one embodiment of the present disclosure.

With reference to FIG. 3, a detailed description follows. FIG. 3 schematically shows the locations of an MFP 100, PCs 200, and obstacles (desks, partitions, etc.) within an area where the MFP 100 is located. In FIG. 3, an MFP 100 is labeled "MFP", and each PC 200 is labeled "PC". This applies equally to FIG. 5, which will be referred to later.

Suppose, of the plurality of PCs 200, the PC 200 indicated by a double circle in FIG. 3 is the source of an execution request. In this case, there exist a plurality of movement routes (indicated by arrows in FIG. 3) that a user can take after leaving the location of the execution request source PC 200 to reach the location of the MFP 100. Of these movement routes, the MFP 100 determines the shortest (indicated by a solid-line arrow in FIG. 3) as the movement route that the user will take. The controller 110 takes the determined movement route as the setting reference route.

Having determined the setting reference route, the controller 110 then sets the printing speed of the printing section 2 based on the length of the setting reference route. For example, the printing speed of the printing section 2 can be set at one of three different speeds: high, medium, and low. The controller 110 sets the printing speed of the printing section 2 at one of the three speeds in such a way that, the longer the setting reference route, the lower the printing speed of the printing section 2. The printing speed of the printing section 2 may be set at one of two different speeds, or one of four or more different speeds.

To allow the setting of the printing speed of the printing section 2, in the storage 113, there is stored correspondence information 150 in which ranges of length that correspond to the three different printing speeds, namely high, medium, and low respectively, are defined (see FIG. 2). Having determined the setting reference route, the controller 110 sets the printing speed of the printing section 2 at, of the three printing speeds defined in the correspondence information 150, the printing speed that corresponds to the length of the setting reference route.

Figure 4:
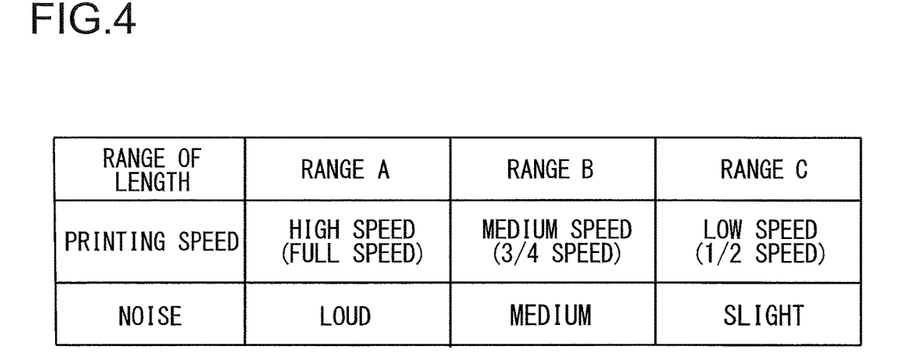
FIG. 4 is a diagram illustrating correspondence information stored in the multifunction peripheral according to one embodiment of the present disclosure.
Figure 5:
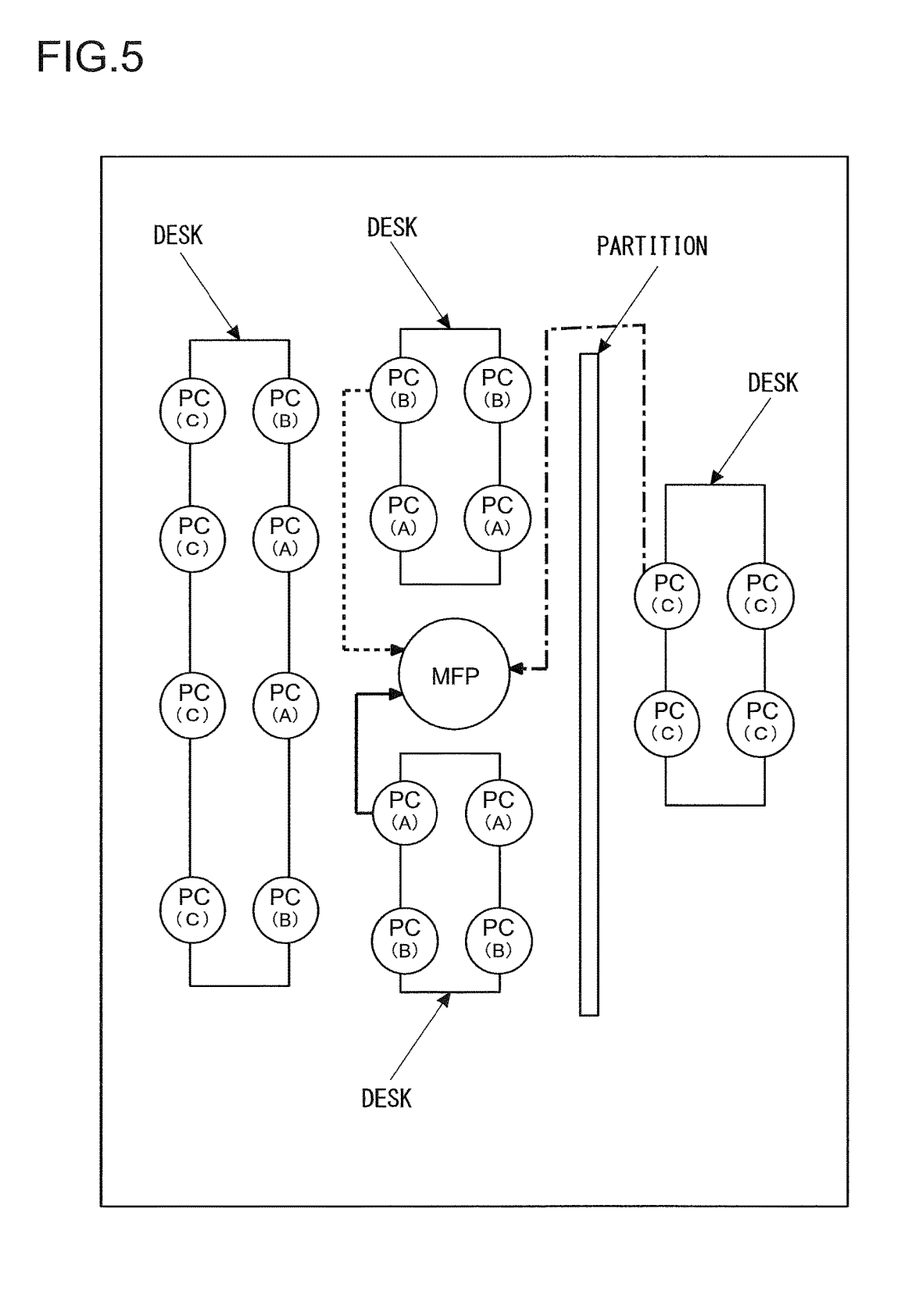
FIG. 5 is a diagram illustrating the route search routine executed in the multifunction peripheral according to one embodiment of the present disclosure.

For example, suppose, as shown in FIG. 4, in the correspondence information 150, it is defined that a length that falls in range A corresponds to high speed, that a length that falls in range B corresponds to medium speed, and that a length that falls in range C corresponds to low speed. And assume, as shown in FIG. 5, of the plurality of PCs 200, the PC 200 labeled A has a setting reference route (indicated by a solid-line arrow) whose length falls in range A, the PC 200 labeled B has a setting reference route (indicated by a broken-line arrow) whose length falls in range B, and the PC 200 labeled C has a setting reference route (indicated by a dash-and-dot-line arrow) whose length falls in range C.

In this case, if the PC 200 labeled A is the source of an execution request for a print job, the printing speed is set at high speed; if the PC 200 labeled B is the source of an execution request for a print job, the printing speed is set at medium speed; and if the PC 200 labeled C is the source of an execution request for a print job, the printing speed is set at low speed.

Having set the printing speed of the printing section 2 based on the length of the setting reference route, the controller 110 adjusts the rotation speeds of the motors M to switch the sheet transport speed so that the printing section 2 operates at the set printing speed. On switching the sheet transport speed, the controller 110 accordingly switches also the primary sheet feed timing (the timing with which a sheet P is fed into the sheet transport passage 20) and the secondary sheet feed timing (the timing with which a sheet P is fed to the nip between the photosensitive drum 51 and the transfer roller 55). According to how the sheet transport speed (the rotation speed of the photosensitive drum 51) is switched, the rotation speed of a polygon motor for rotating a polygon mirror in the exposing device 53 may also be switched. Specifically, the rotation speed of the polygon motor may be so controlled to be the lower the lower the sheet transport speed (the longer the setting reference route).

For example, when the printing speed of the printing section 2 is set at high speed, the controller 110 so controls that the motors M rotate at their full speed (the highest of three speeds) during job execution; when the printing speed of the printing section 2 is set at medium speed, the controller 110 so controls that the motors M rotate at three-quarters of their full speed during job execution; when the printing speed of the printing section 2 is set at low speed, the controller 110 so controls that the motors M rotate at one-half of their full speed (the lowest of three speeds) during job execution.

With the motors M rotating at the lowest speed during job execution, they make slight driving noise, and so do any driving mechanisms (including gears and rollers) that are driven by the driving forces of the motors M. Since the sheet transport speed is then accordingly low, sheets P make slight contact noise when they make contact with a guide member in the sheet transport passage 20 during transport. With the motors M rotating at the highest speed during job execution, the motors M and the driving mechanisms make louder driving noise than with the motors M rotating at the lowest speed during job execution, and sheets P make louder contact noise.

Specifically, as shown in FIG. 4, the longer the setting reference route, the lower the printing speed (the rotation speeds of the motors M during job execution), and thus the lower the noise produced by the MFP 100 during job execution. Inconveniently, with the motors M rotating at low speed during job execution, it takes a longer time to print the same number of sheets than with the motors M rotating at high speed during job execution. However, the longer the setting reference route, the longer it takes for a user who has left the location of the execution request source PC 200 to reach the MFP 100. Thus, the user who has come to fetch the printed document can have it without having to wait for a long time.

A change in the layout of the area where the MFP 100 is located may bring changes in the locations of the MFP 100, PCs 200, and obstacles. To cope with that, the printer driver installed on the PCs 200 is additionally provided with a function of specifying the layout of the area where the MFP 100 is located (the locations of the MFP 100, PCs 200, and obstacles). For example, when the printer driver is run and a predetermined operation is made, a layout setting screen (unillustrated) is displayed. Simply by arranging individual objects corresponding to the MFP 100, PCs 200, and obstacles on the layout screen, a user can specify the layout of the area where the MFP 100 is located. In other words, having the printer driver installed on them, the PCs 200 accept entry of information on the locations of the MFP 100, PCs 200, and obstacles.

The location information entered in a PC 200 can be transmitted to the MFP 100 across a LAN. The location information from the PC 200 is received by the communication unit 120. When the communication unit 120 receives location information, based on the location information, the controller 110 updates the route information 130. Thus, even when there is a change in the layout of the area where the MFP 100 is located, the route information 130 stored in the MFP 100 can be updated easily based on the changed layout.

Procedure for Setting the Printing Speed: With reference to the flow chart in FIG. 6, a description will now be given of a procedure for setting the printing speed of the printing section 2. The flow shown in FIG. 6 starts when the MFP 100 (communication unit 120) receives a print job from a PC 200.

Figure 6:
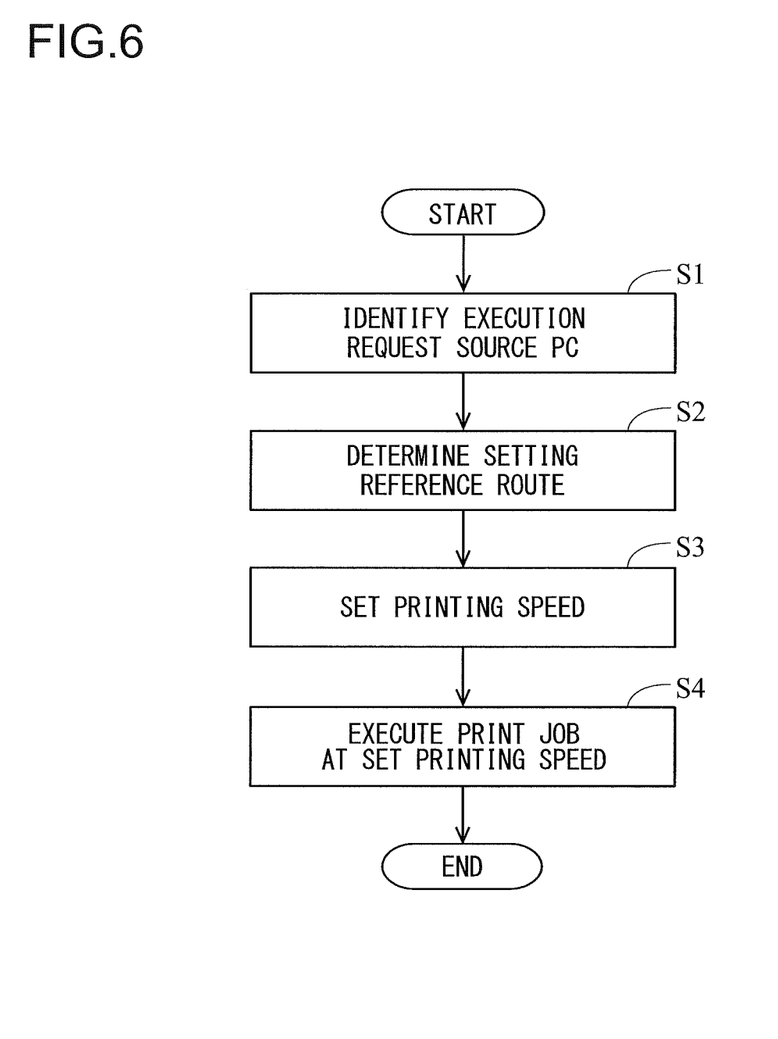
FIG. 6 is a flow chart illustrating a procedure for setting a printing speed in the multifunction peripheral according to one embodiment of the present disclosure.

At Step S1, based on the identification information included in the job data of the print job, the controller 110 identifies the PC 200 that has requested execution of the print job. Then, at Step S2, based on the route information 130, the controller 110 determines a movement route (setting reference route) along which the user will move from the execution request source PC 200 to the MFP 100, and determines the length of the setting reference route.

Subsequently, at Step S3, based on the correspondence information 150, the controller 110 selects the printing speed that corresponds to the length of the setting reference route, and sets the printing speed of the printing section 2 at the selected printing speed. Then, at Step S4, the controller 110 instructs the printing section 2 to execute the print job at the set printing speed.

According to the embodiment, the MFP 100 (image forming apparatus) includes: the communication unit 120 that is communicably connected to the PC 200 (computer) that can be the source of the request to execute the print job, the communication unit 120 receiving the print job from the execution request source PC 200; the printing section 2 that executes the print job at the set printing speed when the communication unit 120 receives the print job; the controller 110 that sets the printing speed for the print job; and the storage 113 that stores the information. In the storage 113 is stored the route information 130 on the basis of which the movement route along which the user moves from the PC 200 to the MFP 100 is determined. When the communication unit 120 receives the print job, the controller 110 identifies the execution request source PC 200, determines the movement route along which the user moves from the execution request source 200 to the MFP 100, and sets the printing speed of the printing section 2 lower the longer the determined movement route (sets the printing speed of the printing section 2 higher the shorter the determined movement route).

With the configuration according to the embodiment, the longer the movement route along which the user moves from the execution request source PC 200 to the MFP 100, the lower the printing speed of the printing section 2 is set. With the printing section 2 operating at low speed, the MFP 100 produces lower driving noise than with the printing section 2 operating at high speed. This helps reduce, when a PC 200 that is located a long movement route away from the MFP 100 is the execution request source, the driving noise produced by the MFP 100. It is thus possible to make the driving noise from the MFP 100 less annoying to the user.

A long movement route traveled by the user moving from the execution request source PC 200 to the MFP 100 signifies a long time taken by the user who has left the location of the execution request source PC 200 to reach the location of the MFP 100. Thus, for the execution request source PC 200 from which the user needs to travel a long movement route to reach the MFP 100, even when the printing section 2 is operated at low printing speed, the execution request source user who has come to fetch the printed document (the user who has reached the MFP 100) can have it without having to wait for a long time. That is, the user who has come to fetch the printed document feels no loss of convenience.

Even if the straight-line distance between the execution request source PC 200 and the MFP 100 is short, an obstacle such as a partition may be present between the PC 200 and the MFP 100; the user then takes a longer time to move from the location of the execution request source PC 200 to the location of the MFP 100. Thus, if the printing speed of the printing section 2 is set based on the straight-line distance between the execution request source PC 200 and the MFP 100, even though it actually takes longer for the user who has left the location of the execution request source PC 200 to reach the location of the MFP 100, the printing section 2 is operated at high speed. Thus, inconveniently, the motors M make unnecessarily high noise.

To circumvent the inconvenience, according to the embodiment, when setting the printing speed of the printing section 2, the controller 110 determines the movement route (setting reference route) along which the user moves from the execution request source PC 200 to the MFP 100 without interfering with the obstacle based on the location of the MFP 100, the location of the execution request source PC 200, and the location of the obstacle.

According to the embodiment, the controller 110 sets the printing speed of the printing section 2 at, of the plurality of printing speeds defined in the correspondence information 150, the printing speed that corresponds to the length of the setting reference route determined based on the route information 130. It is thus possible to easily set the printing speed of the printing section 2 at a speed that suits the length of the setting reference route.

It should be understood that the embodiment disclosed herein is in every aspect illustrative and not restrictive; the scope of the present disclosure is defined not by the description of the embodiment given above but by the appended claims, and encompasses any modifications and variations made in the sense and scope equivalent to those of the claims.

What is claimed is:
1. An image forming apparatus, comprising:
a communication unit that is communicably connected to a plurality of computers of which any can be a source of an execution request for a print job, the communication unit receiving the print job from one of the computers that is the source of the execution request;
a printing unit that executes the print job at a set printing speed when the communication unit receives the print job;
a controller that sets the printing speed for the print job; and
a storage that stores information,
wherein
the storage stores route information based on which to determine a movement route along which a user moves from each of the plurality of computers to the image forming apparatus, and
when the communication unit receives the print job, the controller
identifies the computer that is the source of the execution request,
determines, based on the route information, the movement route along which the user moves from the computer that is the source of the execution request to the image forming apparatus, and sets the printing speed lower the longer the determined movement route.

2. The image forming apparatus of claim 1, wherein the route information includes information on
- a location of the image forming apparatus,
- a location of each of the plurality of computers, and
- a location of an obstacle that can interfere with the user when the user moves from each of the plurality of computers to the image forming apparatus, and when setting the printing speed of the printing unit, the controller
- determines the movement route along which the user moves from the computer that is the source of the execution request to the image forming apparatus without interfering with the obstacle based on the location of the image forming apparatus, the location of the computer that is the source of the execution request, and the location of the obstacle, and
- sets the printing speed lower the longer the determined movement route.

3. The image forming apparatus of claim 1, wherein the storage stores correspondence information in which a plurality of ranges of length are defined that correspond respectively to a plurality of printing speeds at one of which the printing speed of the printing unit can be set, and the controller sets the printing speed of the printing unit at that one of the plurality of printing speeds defined in the correspondence information which corresponds to a length of the movement route determined based on the route information.

4. An image formation system, comprising:
the image forming apparatus of claim 1; and
the plurality of computers that are communicably connected to the image forming apparatus,
wherein
each of the plurality of computers
- accepts entry by the user of location information on
  - a location of the image forming apparatus,
  - a location of each of the plurality of computers, and
  - a location of an obstacle that can interfere with the user when the user moves from each of the plurality of computers to the image forming apparatus, and
- transmits the location information to the image forming apparatus, and
on receiving the location information from any of the plurality of computers, the image forming apparatus updates the route information based on the location information.

* * * * *